Jan. 8, 1929.
H. WALKER
1,698,179
VEHICLE FRAME SILL
Filed March 30, 1927
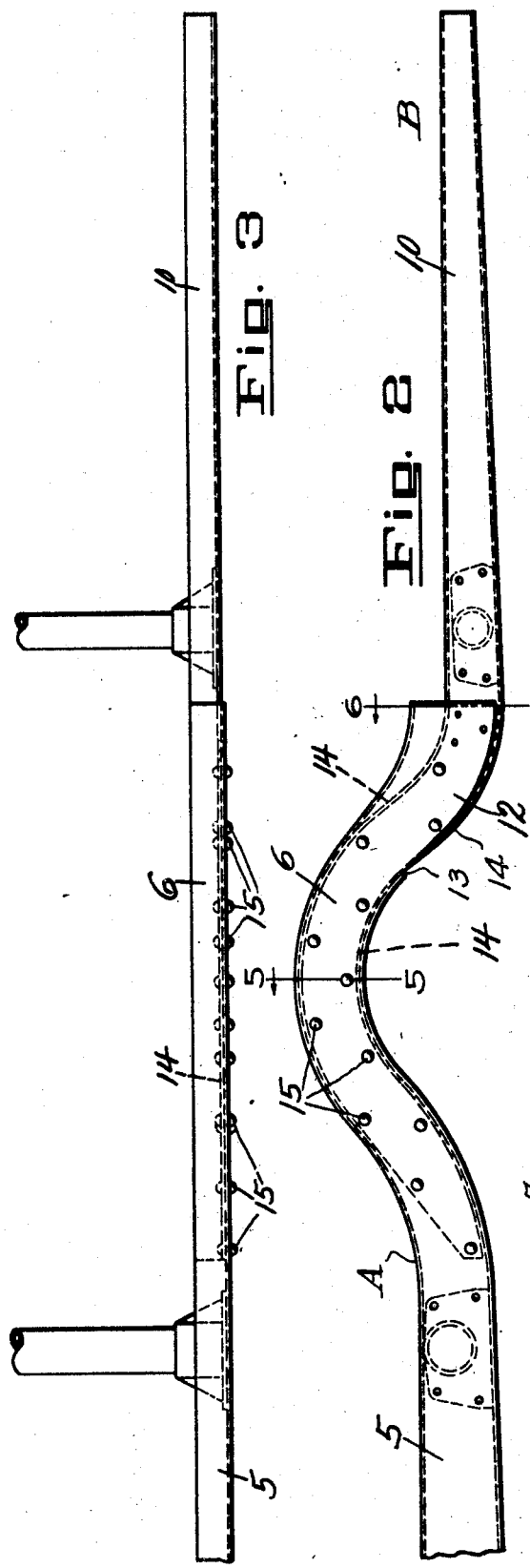
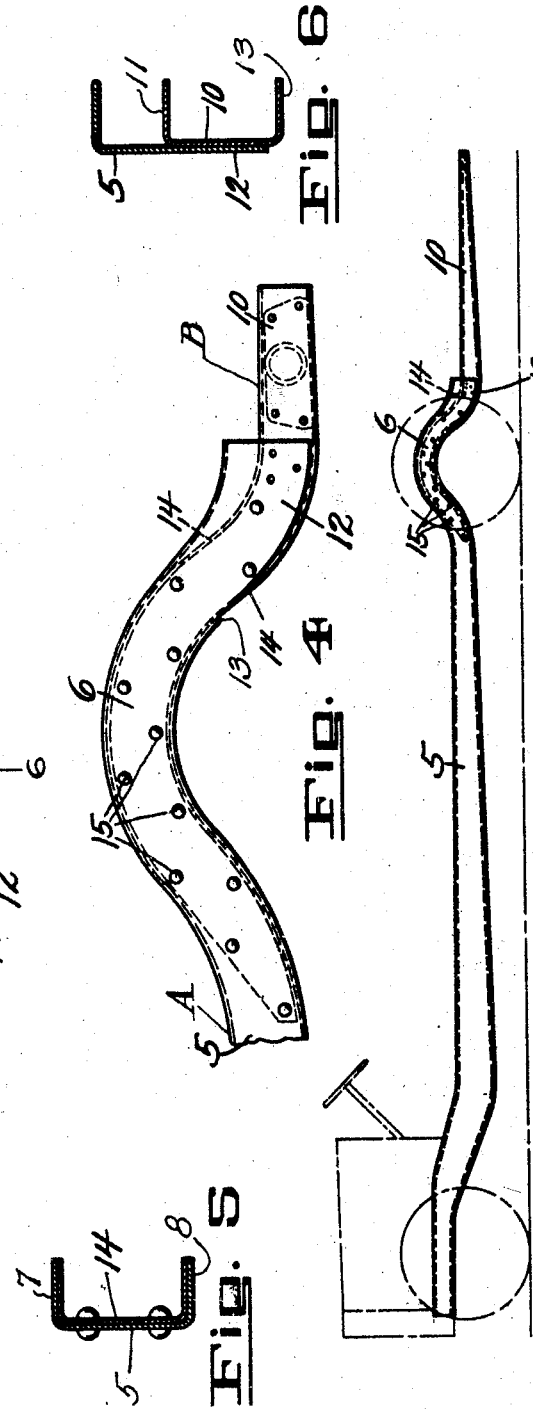
INVENTOR
Hubert Walker.
BY
ATTORNEY.

Patented Jan. 8, 1929.

1,698,179

UNITED STATES PATENT OFFICE.

HUBERT WALKER, OF ROYAL OAK, MICHIGAN, ASSIGNOR TO AMERICAN CAR AND FOUNDRY MOTORS COMPANY, OF NEW YORK, N. Y., A CORPORATION OF DELAWARE.

VEHICLE FRAME SILL.

Application filed March 30, 1927. Serial No. 179,563.

My invention relates to motor vehicle frames, and more particularly an improved sill therefor.

The invention has for its principal object the provision of a motor vehicle frame sill embodying a pair of sill sections rigidly secured together with the rear section slightly dropped so as to accommodate the rear platform of a bus or other vehicle having a rear exit.

Another object of the invention is to provide a sill having a main portion which is substantially similar to the main portions of the sills used in various types of motor vehicles such as those of the street car type, double deck bus type and parlor car bus type. In forming the sills for vehicles a die is used as is well known, and the present invention contemplates the use of a single die for forming a sill portion or section for these various types of vehicles and in utilizing the sill formed by said die for attaching extensions to accommodate various types of vehicle bodies.

Reference is had to the accompanying drawings which illustrate the preferred form of the invention; though it is to be understood that the invention is not limited to the exact details of construction shown and described, as it is obvious that various modifications thereof within the scope of the claims will occur to persons skilled in the art.

In the drawings:

Figure 1 is a diagrammatic side elevation of a motor vehicle embodying my improved sill;

Figure 2 is a fragmentary side elevation of the frame sill;

Figure 3 is a top plan view of the same;

Figure 4 is a fragmentary side elevation of a modified form of sill;

Figure 5 is a vertical transverse sectional view taken on line 5—5 of Figure 2; and Figure 6 is a similar view taken on line 6—6 of Figure 2.

Referring now more particularly to the drawings the invention contemplates the provision of a side sill having a main portion designated generally as A and an extension secured to the rear end of the main portion, the extension being designated generally as B.

The main portion of the side sill is formed by a standard die and is substantially a channel having a web 5, a top chord 7 and a bottom chord 8, as clearly shown in Fig. 5. The rear end of the main portion is arched as shown at 6 and has secured thereto the extension B. Said extension B is also a channel having a web 10, and top and bottom chords 11 and 13 respectively, as clearly indicated in Fig. 6. The forward end of the extension is arched as at 14 and said arch 14 is of greater height than the beforementioned arch, although for the major portion thereof the arch 14 is complemental to the arch 6 whereby to be received within the channel in close fitting engagement therewith as shown in Fig. 5 and to be secured thereto by rivets 15 or the like.

The invention shown is particularly designed for use with vehicles having a rear exit, and in such a type of vehicle, it is desirable that the rear platform be arranged relatively low in order to provide a construction which will permit easy egress to passengers from the vehicle. To that end, the arch 14 is, as before-mentioned, of greater height than the arch 6 whereby when the two sections are assembled in connected relation, the extension B will be arranged in a horizontal plane which is lower than the horizontal plane of the main section 5 ahead of the arch. To effect this arrangement, the lower chord 8 of the main portion A is cut as at 13 and from this point to the end of the main portion the lower chord is straightened in line with the web 5 forming a wide web portion 12 shown clearly in Fig. 6 against which the web 10 of the extension bears and to which it is secured, thereby providing a strong and durable connection of the rear end of the arch 6 with the extension B and reinforcing the rear end of the arch 6 and effecting a relative arrangement for positioning of the section A and extension B such that the latter is arranged in a lower horizontal plane than the main portion A whereby the rear platform of a vehicle may be supported in a relatively low plane. The sill shown in Fig. 2 is provided with a relatively long extension B and this particular type of sill is adapted for use in a double deck bus construction where a long rear platform is provided. The modification disclosed in Fig. 4 shows a comparatively short extension B and this particular type is employed in connection with the parlor car type of motor bus; the remaining construction of the sill shown in Fig. 4 being identical with the construction shown in Fig. 2.

What is claimed is:

1. In combination, a main channel shaped sill, an arch formed with one end thereof, one leg of which consists of a single flat web, a rear section of channel shape formation, an arch formed upon the inner end thereof and embraced by the other arch, the rear section being arranged with its upper face disposed below the upper face of the main sill section to accommodate a motor vehicle rear platform thereon, and fastenings rigidly connecting the two arches together.

2. A vehicle frame sill comprising a main section having an arched rear end and an auxiliary section secured to the arched end and arranged in a lower horizontal plane than the main section.

3. A vehicle frame sill comprising a main section having an arched rear end and an auxiliary section having an arched end secured to the arched rear end of said main section and so connected thereto as to lie in a horizontal plane lower than the plane of the main section.

4. A vehicle frame sill comprising a main section of channel form having an arched rear end, and an extension having an arched end complemental with the arched end of the main section secured to the main section and arranged in a horizontal plane below the main section.

5. A vehicle frame sill comprising a main section of channel form having top and bottom chords and a web, said section having its rear end arched with a portion of the bottom chord formed into the web, and an extension having an arched end secured to the arched end of the main section, the arch of the extension being of greater height than the arch of the main section whereby when the main section and extension are connected together the latter is arranged in a lower horizontal plane than the main section.

6. A vehicle frame sill comprising sections each having an arched end by which they are connected, one of the arches being of greater height than the other whereby when said sections are connected one thereof is arranged in a horizontal plane lower than the other.

7. A chassis frame side member comprising sections having connected arched ends with one of said sections arranged in a horizontal plane lower than the other section whereby to provide a low support for the portion of a vehicle body arranged over said section.

8. A sill comprising a main section of channel shape for a portion of its length and angle-shaped at its end and being arched within both the channel and angle shaped zones, in combination with a channel shaped auxiliary section having an arched zone lapping and being secured within the arch of said main section.

In witness whereof I have hereunto set my hand.

HUBERT WALKER.